(12) United States Patent
Bristow

(10) Patent No.: US 7,753,537 B1
(45) Date of Patent: Jul. 13, 2010

(54) GLARE REDUCTION DEVICE

(76) Inventor: Beverly Bristow, P.O. Box 4067, Middletown, NY (US) 10941

( * ) Notice: Subject to any disclaimer, the term of this patent is extended or adjusted under 35 U.S.C. 154(b) by 336 days.

(21) Appl. No.: 11/874,801

(22) Filed: Oct. 18, 2007

(51) Int. Cl.
*G02B 17/00* (2006.01)

(52) U.S. Cl. .................. 359/605; 359/601; 359/877

(58) Field of Classification Search ......... 359/601–614, 359/838–883
See application file for complete search history.

(56) References Cited

U.S. PATENT DOCUMENTS

| | | | | |
|---|---|---|---|---|
| 3,542,455 A | * | 11/1970 | Jensen | 359/605 |
| 3,840,292 A | * | 10/1974 | Griffin et al. | 359/604 |
| 4,577,929 A | * | 3/1986 | Guillen | 359/608 |
| 5,028,120 A | * | 7/1991 | Taylor | 359/227 |
| 5,076,633 A | * | 12/1991 | Hsu et al. | 296/97.4 |
| 5,450,246 A | | 9/1995 | Jain | |
| 5,513,049 A | * | 4/1996 | Taylor | 359/884 |
| 5,798,881 A | | 8/1998 | Mazurek et al. | |
| 6,142,639 A | | 11/2000 | Jain et al. | |
| 6,886,950 B1 | | 5/2005 | Bullock et al. | |
| 2004/0130811 A1 | | 7/2004 | Campbell | |
| 2005/0264890 A1 | * | 12/2005 | Morrone et al. | 359/601 |

\* cited by examiner

*Primary Examiner*—Thong Nguyen
(74) *Attorney, Agent, or Firm*—Crossley Patent Law; Mark A. Crossley

(57) ABSTRACT

A glare reduction device that includes a pair of external mirrors located on a vehicle, with each mirror including an internal motor and a layer of light-reducing covering that is extendable and retractable over each mirror by a small, internal electric motor. The light-reducing covering is preferably a glare-reducing glass panel, but may also be a glare-reducing film or a glare-reducing filter, with the light-reducing covering being mounted within a guide track. Each of the motors is controlled by a control switch that is located within the passenger compartment of the vehicle, with each electric motor receiving power from the 12-volt DC electrical system of the vehicle. When the motor is activated, it will either extend or retract the light-reducing covering as needed.

3 Claims, 4 Drawing Sheets

GLARE REDUCTION DEVICE

BACKGROUND OF THE INVENTION

The present invention concerns that of a new and improved glare reduction device that includes a pair of external mirrors located on a vehicle, with the mirrors including an internal motor and a light-reducing covering that is extendable and retractable over the mirrors by a small, internal electric motor.

DESCRIPTION OF THE PRIOR ART

U.S. Pat. No. 6,886,950, issued to Bullock et al., discloses a glare reduction rear view mirror assembly for eliminating the glare from headlights of vehicles coming up from behind.

U.S. Pat. No. 5,798,881, issued to Mazurek et al., discloses a dual state mirror assembly for use with motor vehicles which includes an outer substrate which has a surface coated with a thin metal film to act as a beam splitter.

United States Application No. 2004/0130811, filed by Campbell, discloses an apparatus for reducing the glare that is present in side view mirrors at night from vehicle headlights.

U.S. Pat. No. 5,450,246, issued to Jain, discloses a remotely adjustable anti-glare vehicle mirror.

U.S. Pat. No. 6,142,639, issued to Jain et al., discloses a remotely adjustable exterior vehicle rear-view mirror which provides the driver with glare-free viewing toward the rear of the vehicle by switching between a high-reflectivity position and a low-reflectivity position at the same view adjustment.

SUMMARY OF THE INVENTION

The present invention concerns that of a new and improved glare reduction device that includes a pair of external mirrors located on a vehicle, with each mirror including an internal motor and a layer of light-reducing covering that is extendable and retractable over each mirror by a small, internal electric motor. The light-reducing covering is preferably, a glare-reducing glass panel, but may also be a glare-reducing film or a glare-reducing filter, with the light-reducing covering being mounted within a guide track. Each of the motors is controlled by a control switch that is located within the passenger compartment of the vehicle, with each electric motor receiving power from the 12-volt DC electrical system of the vehicle. When the motor is activated, it will either extend or retract the light-reducing covering as needed.

There has thus been outlined, rather broadly, the more important features of a glare reduction device that the detailed description thereof that follows may be better understood and in order that the present contribution to the art may be better appreciated. There are, of course, additional features of the glare reduction device that will be described hereinafter and which will form the subject matter of the claims appended hereto.

It is therefore an object of the present invention to provide a glare reduction device which has all of the advantages of the prior art and none of the disadvantages.

It is another object of the present invention to provide a glare reduction device which may be easily and efficiently manufactured and marketed.

It is another object of the present invention to provide a glare reduction device which is of durable and reliable construction.

It is yet another object of the present invention to provide a glare reduction device which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
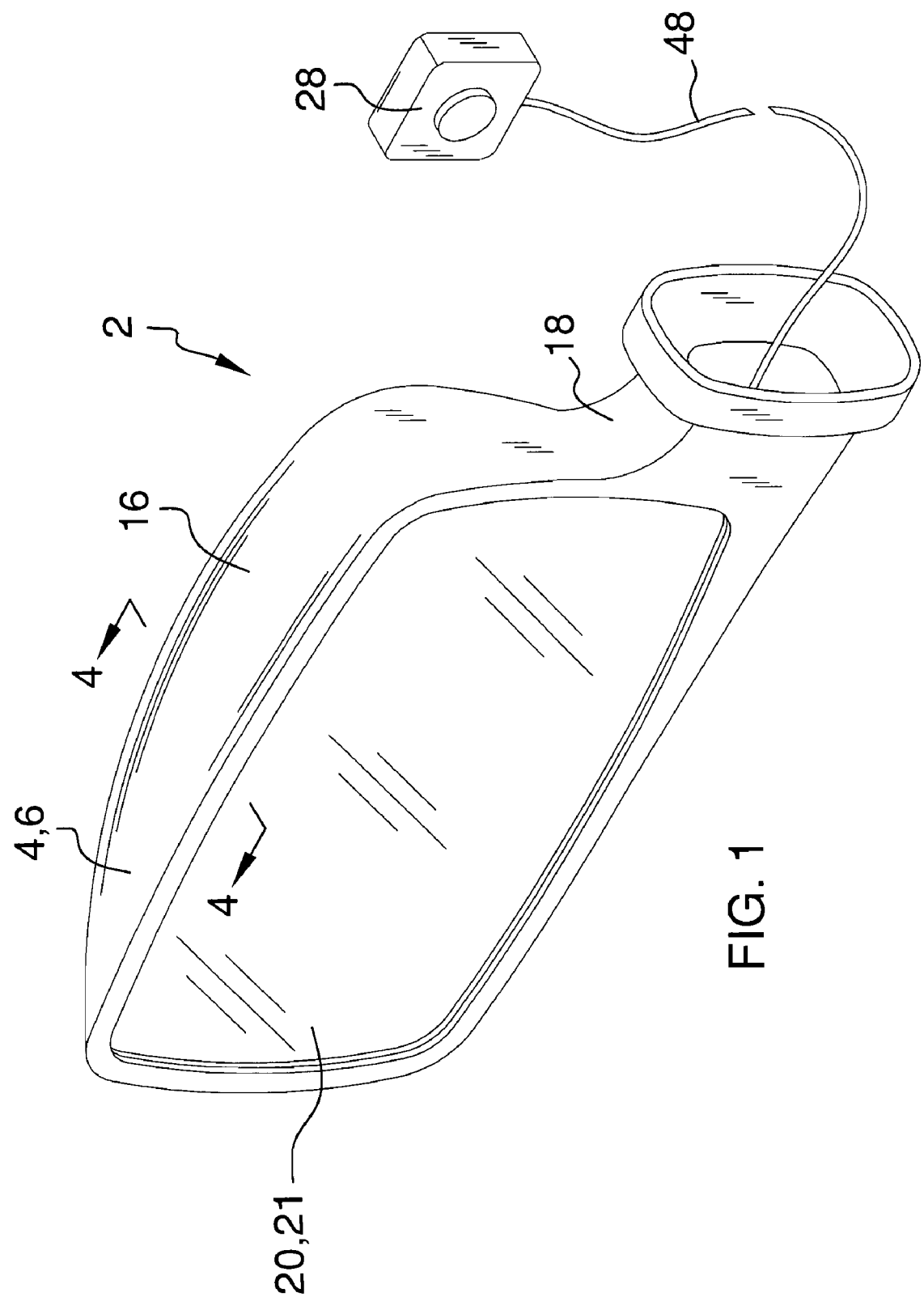
FIG. 1 shows a perspective view of the mirror and accompanying control switch that would be mounted within a vehicle.
Figure 2:
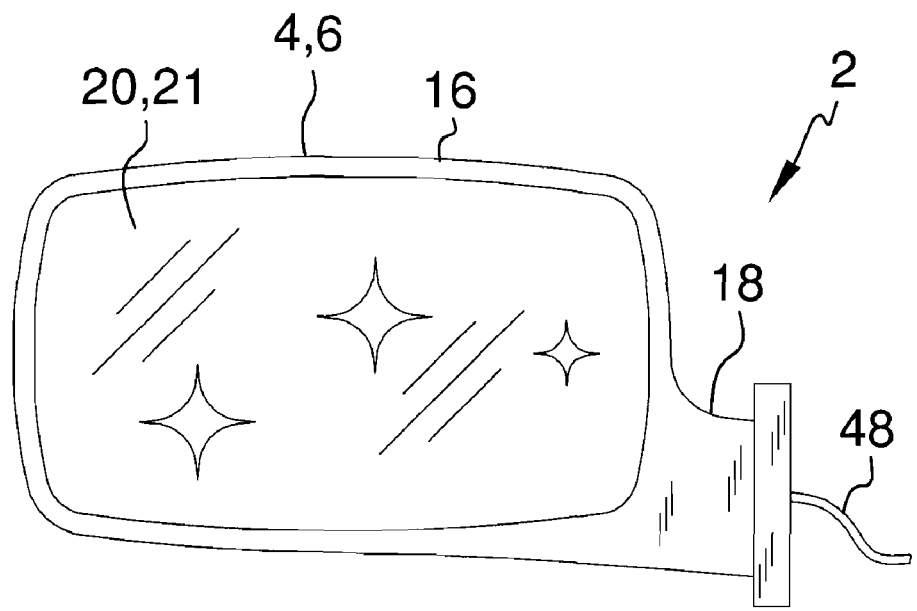
FIG. 2 shows a front view of the mirror associated with the present invention.
Figure 3:
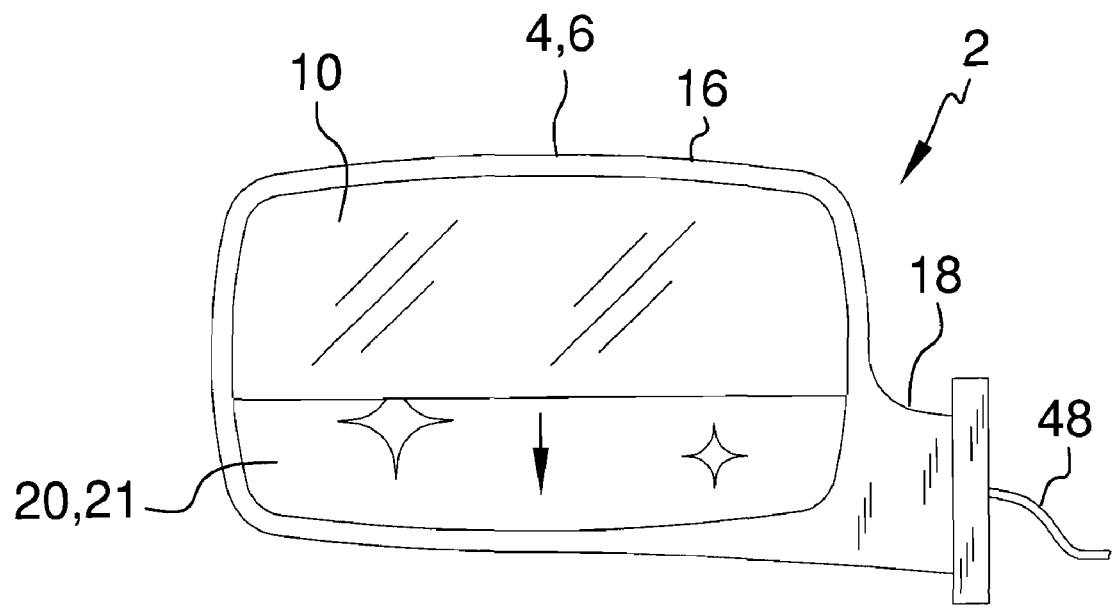
FIG. 3 shows a front view of the mirror associated with the present invention as the glare shield is being lowered over the mirror.
Figure 5:
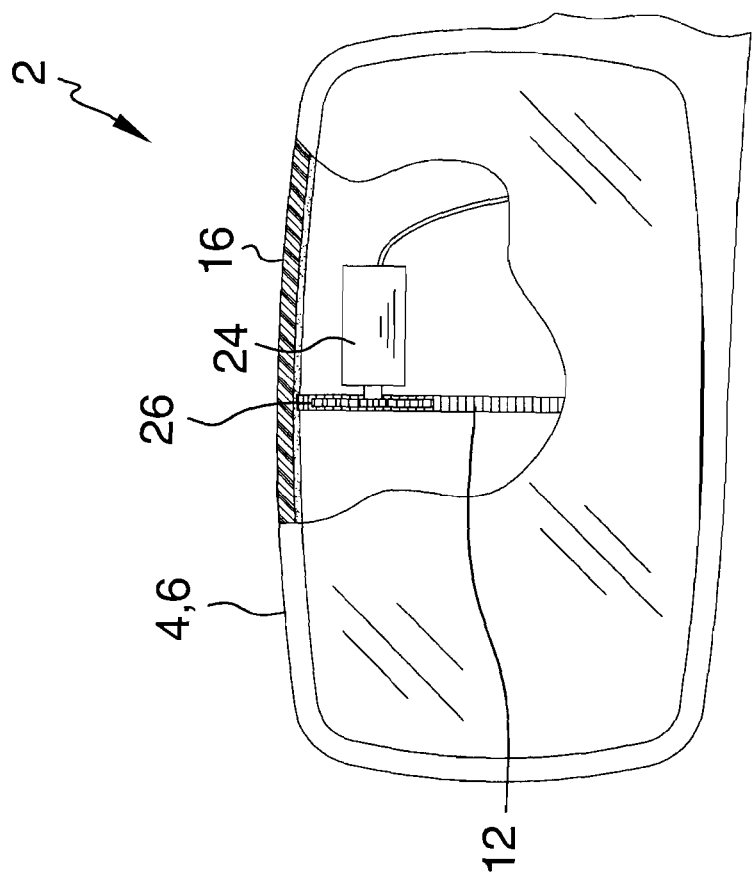
FIG. 5 shows a partial front cutaway view, taken along line 5-5 of FIG. 4, of the mirror associated with the present invention.
Figure 4:
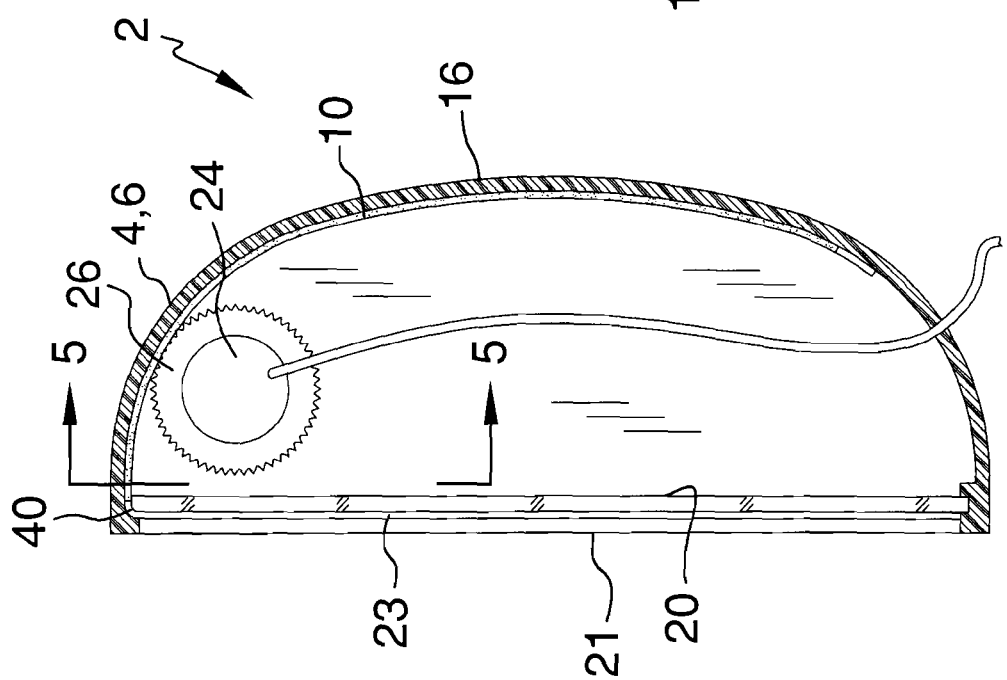
FIG. 4 shows a side cutaway view, taken along line 4-4 of FIG. 1, of the mirror associated with the present invention.
Figure 6:
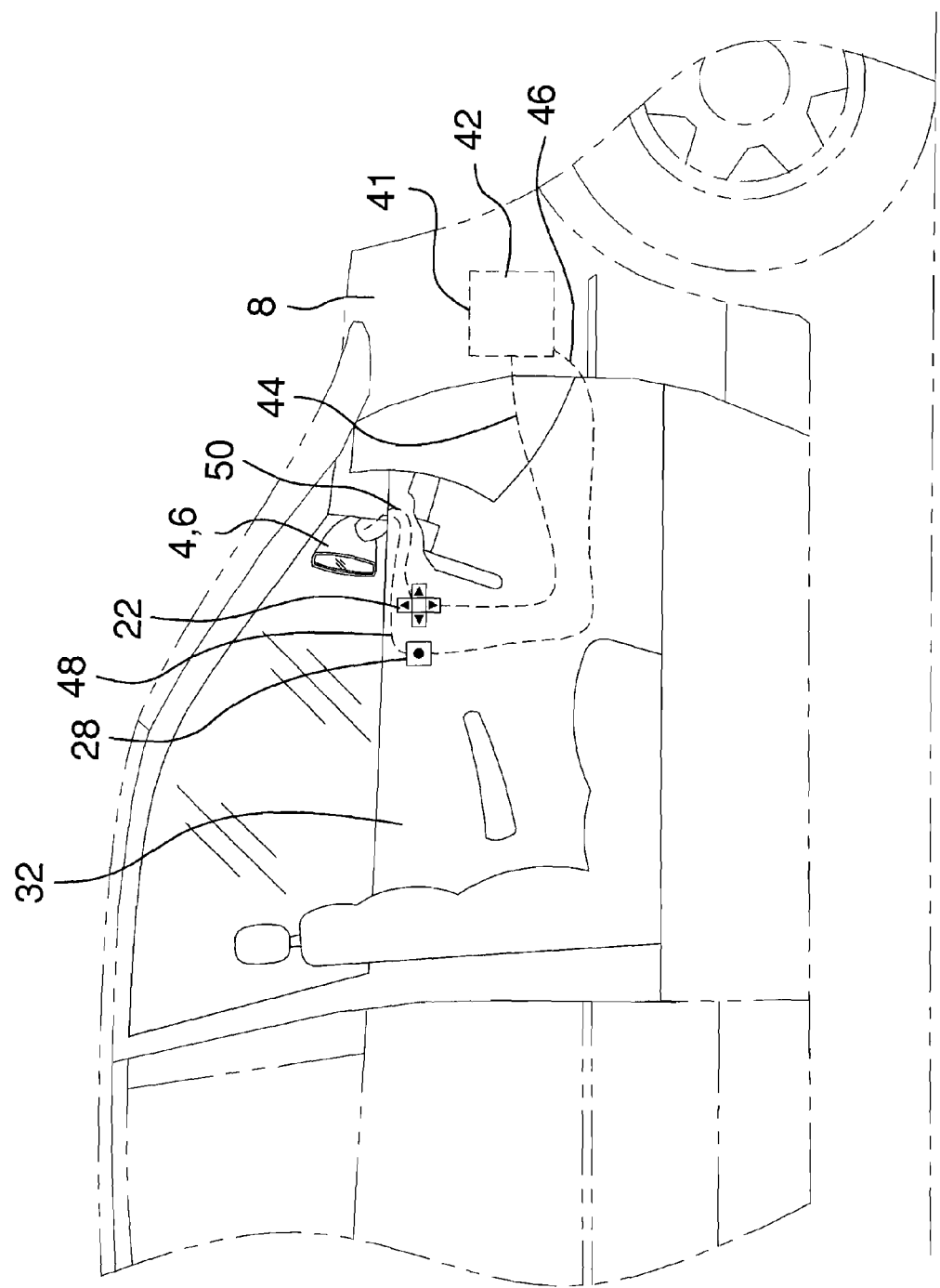
FIG. 6 shows a side view of a vehicle with the vehicle having the present invention mounted within it.

With reference now to the drawings, and in particular to FIGS. 1 through 6 thereof, a new glare reduction device embodying the principles and concepts of the present invention and generally designated by the reference numeral 2 will be described.

As best illustrated in FIGS. 1 through 6, the glare reduction device 2 comprises a pair of side view mirrors comprising a driver's side view mirror 4 and a passenger side view mirror 6 that are attached to a vehicle 8. Each of the mirrors 4 and 6 are essentially the same as those present in existing vehicles and include an outer housing 16, except for the fact that they have been modified to include a light-reducing covering 10 on a guide track 12. The covering 10 is either extendable or retractable, depending on the need of an individual and what the light setting is at a particular time.

Each mirror comprises an outer housing 16 which is attached to the vehicle 8 by a base 18. The outer housing 16 holds a mirror plate 20, which is generally designed to face backward so an individual can see behind the vehicle 8, to a certain extent, while driving the vehicle. The mirror plate 20 of each of the side view mirrors 4 and 6 can each generally be controlled by a control 22 that is located within the vehicle 8, with the control 22 being electronically connected to the mirror plate 20. Mirror plate 20 is covered by outer covering 21, which is located in front of and adjacent to the mirror plate 20. A small gap 23 is located in between the mirror plate 20 and the outer covering 21.

Furthermore, a separate driver motor 24 and gear 26 are present in each of the side view mirrors 4 and 6 of the present invention. Gear 26 is affixed to a guide track 12 that is located on the light-reducing covering 10 that is located within the housing 16 of each side view mirror 4 and 6. The driver motor 24 is connected to a shield activation button 28 by a wire 48, with the shield activation button 28 preferably being located in the passenger compartment 32 of the vehicle 8.

Normally, the light-reducing covering 10 will be located within the housing 16 of the side view mirrors 4 and 6. However, once the driver motor 24 is activated by the shield activation button 28, the driver motor 24 will move the gear 26, which will cause the light-reducing covering 10 to slowly migrate into the gap 23 in between the mirror plate 20 and the outer covering 21 through a small opening 40 in between the housing 16 and the mirror plate 20. Eventually, most of the light-reducing covering 10 will be located within the gap 23, although a small portion of the covering 10 will still be attached to the gear 26 through the guide track 12 so that the covering 10 can be efficiently retracted from within the gap 23 once the need for the covering 10 no longer is present.

Control 22 and shield activation button 28 are designed to serve as switches in between the previous components discussed herein and a power source 41, with the power source 41 preferably being a vehicle battery 42. The control 22 is connected to the power source 41 by a wire 44, while the shield activation button 28 is connected to the power source 41 by a wire 46. Furthermore, shield activation button 28 is connected to the driver motor 24 by a wire 48 and control 22 is connected to the side view mirrors by a wire 50.

With respect to the above description then, it is to be realized that the optimum dimensional relationships for the parts of the present vehicle air freshener device to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A glare reduction device in combination with a vehicle, the glare reduction device comprising:
   a pair of side view mirrors comprising a driver's side view mirror and a passenger side view mirror wherein each of the side view mirrors includes a housing;
   means for attaching each housing of each side view mirror to the vehicle;
   a mirror plate located in each housing of each side view mirror;
   a light-reducing covering located within the housing of each side view mirror;
   means for temporarily covering each mirror plate with the light-reducing covering;
   wherein the means for attaching each side view mirror to the vehicle comprises a base, wherein each base is attached to the housing wherein each base is attached to the vehicle;
   wherein each side view mirror comprises
      an outer covering, the outer covering located in front of and adjacent to each mirror plate;
      a gap located in between each outer covering and the adjacent mirror plate;
   wherein the means for temporarily covering each mirror plate with the light-reducing covering comprises:
      a guide track located on each light-reducing covering;
      a driver motor located within each housing of each side view mirror;
      a gear attached to each driver motor, the gear also being placed against the guide track of the light-reducing covering;
      an opening in between the housing and the mirror plate;
      power means for providing power to the driver motor;
      control means for activating the driver motor; and
      wherein activating the driver motor causes the gear to slowly move the light-reducing covering through the opening and in front of the mirror plate.

2. A glare reduction device in combination with a vehicle according to claim 1 wherein the power means for providing power to the driver motor comprises a vehicle battery.

3. A glare reduction device in combination with a vehicle according to claim 2 wherein the control means for activating the driver motor further comprises:
   (a) an activation button located within the vehicle;
   (b) a first wire connecting the activation button to the driver motor;
   (c) a second wire connecting the activation button to the vehicle battery; and
   (d) wherein the activation button acts as a switch in between the driver motor and the vehicle battery.

* * * * *